(12) United States Patent
Diez et al.

(10) Patent No.: US 6,675,920 B1
(45) Date of Patent: Jan. 13, 2004

(54) TOWING VEHICLE FOR AN AIRCRAFT

(75) Inventors: Helmut Diez, Filderstadt (DE); Klaus Philipp, Waiblingen (DE)

(73) Assignee: Schopf Maschinenbau GmbH (DE)

( * ) Notice: Subject to any disclaimer, the term of this patent is extended or adjusted under 35 U.S.C. 154(b) by 0 days.

(21) Appl. No.: 10/030,509

(22) PCT Filed: May 20, 2000

(86) PCT No.: PCT/EP00/04549
§ 371 (c)(1),
(2), (4) Date: Jan. 9, 2002

(87) PCT Pub. No.: WO01/03986
PCT Pub. Date: Jan. 18, 2001

(30) Foreign Application Priority Data

Jul. 9, 1999 (DE) .......................................... 199 31 865

(51) Int. Cl.[7] ............................................... B60K 28/08
(52) U.S. Cl. ........................... 180/14.6; 180/904; 303/3
(58) Field of Search ................................. 180/14.6, 904; 303/3, 20

(56) References Cited

U.S. PATENT DOCUMENTS

| 4,113,041 A | | 9/1978 | Birkeholm | |
| 4,923,253 A | | 5/1990 | Pollner et al. | |
| 4,976,499 A | | 12/1990 | Guichard et al. | |
| 5,219,033 A | * | 6/1993 | Pollner et al. | 180/14.6 |
| 5,516,252 A | | 5/1996 | Francke et al. | |
| 5,680,125 A | * | 10/1997 | Elfstrom et al. | 340/958 |

FOREIGN PATENT DOCUMENTS

| DE | 25 26 957 | 1/1976 | ............. B64F/1/10 |
| DE | 43 06 026 A1 | 9/1994 | ............. B64F/1/22 |
| DE | 37 32 647 C2 | 4/1998 | ............. B60T/8/26 |
| EP | 0 526 680 A1 | 7/1988 | ............. B60T/7/20 |
| EP | 0 275 787 | 2/1993 | ............. B60T/7/20 |
| WO | WO 98/25822 | 6/1998 | ............. B64F/1/22 |

* cited by examiner

Primary Examiner—Christopher P. Schwartz
(74) Attorney, Agent, or Firm—Pendorf & Cutliff

(57) ABSTRACT

The invention relates to a towing vehicle for aircraft, comprising at least one operator's cabin which comprises control, elements for steering, accelerating and braking the towing vehicle, in addition to a coupling member for creating a detachable connection between the aircraft and the towing vehicle. The towing vehicle can be braked by hydraulic or pneumatic brakes 46, 46' acting on at least two wheels of the vehicle, whereby the braking control element is configured as a brake pedal 10, 10' which actuates the brakes 46, 46' either directly or via a control circuit. In order to simplify the construction of the braking system and to guarantee an optimal braking performance under all operating conditions, according to the invention, the brake pedal 10, 10' is respectively coupled to a position or angle sensor 12, 12', whose position or angle can be converted into an electric control signal with a predetermined value which controls at least one electro-hydraulic brake valve, using an electric signal transmission link 26, 26'.

11 Claims, 2 Drawing Sheets

TOWING VEHICLE FOR AN AIRCRAFT

BACKGROUND OF THE INVENTION

1. Field of the Invention

The invention concerns a towing vehicle for aircraft, with at least one operator's cabin, which includes control elements for steering, accelerating and braking the towing vehicle, in addition to a coupling member for creating a detachable connection between the aircraft and the towing vehicle, wherein the towing vehicle can be braked by hydraulic or pneumatic brakes acting on at least two wheels of the vehicle and wherein the braking control element is configured as a brake pedal which actuates the brakes either directly or via a control circuit.

Aircraft towing vehicles are motorized vehicles which must tow, push and brake a substantially greater mass than their own mass. Accordingly there are special requirements in particular for the braking system of the towing vehicle, in particular when taking into consideration that the operational safety of the towing vehicle must be maintained under very diverse operating conditions (either towing or operating without load). Aircraft tow vehicles can in general be divided into "towbar-tractors" and "towbarless-tractors". Although the present invention was particularly desired for towbar tractors, it can however be utilized also for towbarless tractors.

2. Description of the Related Art

Known aircraft towing vehicles are provided with a conventional hydraulic brake, wherein the brake pedal acts directly on a brake medium (hydraulic fluid). The brake force is therein directed through proportional valves, which produce a braking effect proportional to the brake pedal position. Also known are servo-controlled brakes, wherein the brake pedal opens or closes a control circuit, which controls a release valve, which activates the braking effect in the main circuit. One disadvantage of the known braking systems is comprised therein, that between the brake pedal or as the case maybe the main brake valve provided in immediate proximity to the brake pedal and the brakes, a relatively long brake line must be provided. Besides the high cost of running long circuits there is the substantial disadvantage of the known brake systems that on the basis of the elasticity of the hydraulic lines (stretching or expansion of brake hoses under pressure) delays occur between the actuation of the brake pedal and the initiation of the braking effect, which results in an imprecise brake operation. In the case of so-called spongy brakes there can occur overbraking or under-braking reactions, and besides this feedback occurs on the pedal, which feedback is felt by the operator. In general, the known brake system has little sensitivity.

A further disadvantage of the known brake system is comprised therein, that the hydraulic lines must be continued up to the operator cabin. Heat and noise produced in the brake system is transmitted into the operator cabin in a distracting manner. Besides this, there is the danger of an accident due to rupturing of brake hoses or due to leakage in the operator area. Finally, it has been found to be disadvantageous in the known brake systems, that supplemental signals from operating sensors can only be indirectly introduced into the system. Dynamic contributory effects can practically not be compensated for due to the inertness or response lag in the hydraulic system.

SUMMARY OF THE INVENTION

Beginning therewith it is the task of the present invention to provide a brake system for a tow vehicle for aircraft, which is simple in construction, which exhibits a high sensitivity during braking and provides for small response delays by using short hydraulic paths and which can be modified to take into consideration supplemental control variables or, as the case may be, process variables, which result from the varying operating conditions.

The invention is based on the recognition that by employing an electronic brake control the otherwise necessary hydraulic complexity can be minimized, and that in such a system utilization can be made of various supplemental signals, provided by operating sensors, for controlling the brakes. According to the invention it is thus provided that the brake pedal is coupled with a position or angle sensor, which translates the pedal position or angle into an electrical desired value position signal, which controls via an electrical signal transmission circuit at least one electro-hydraulic brake valve. Preferably, for safety reasons, two separate brake circuits are provided, which are respectively controlled together by operation of the brake pedal. Herein each brake circuit preferably includes a brake pressure controlling main brake valve configured as a proportional valve and including an actuating ram, which controls either the flow-through cross section or, preferably, the pressure in the brake circuit.

It is important during towing as well as during pushing of an aircraft that the operator of the tow vehicle is in control in the respective directions of travel of the vehicle. Since in general during the maneuvering of an aircraft both towing as well as pushing is involved, in a preferred embodiment of the invention two operator cabins are preferably provided at the respective ends of the vehicle, which are respectively provided with the identical control elements.

The main brake valve can be operated by, respectively, an electronically controlled adjustment piston actuatable by a magnet valve and including a displacement pick up, wherein the displacement pick up provides an electronic actual position value for the control circuit. For safety reasons the adjustment piston should include a ram separated from the operating ram and in opposition thereto.

In general it is also possible, in place of the hydraulic brake, to also employ a cable control brake or a pneumatic brake, which can be controlled in comparable manner. It is significant that in every case no additional measuring points are required in the brake medium, which would be necessary for controlling or regulating the system. The actual control of the brake system occurs in the preceding stage prior to the brake actuating hydraulic circuit.

In a preferred embodiment of the invention the control circuit includes an electronic computer as control device for the brakes, which receives at least the desired position signal component of the brake signal as a control value. The control circuit accordingly includes the pedal as desired value provider, while the actual value is detected at the displacement pick up of the adjustment position for the main brake valve. By means of the electronic computer the actual value is continuously compared with the desired value and, when necessary, appropriately adjusted.

The coupling means between aircraft and tow vehicle is preferably configured as a tow rod, wherein a coupling element for the tow rod is to be provided at least one of the vehicle end areas. Preferably the coupling element includes a sensor, preferably designed as an angle provider, for the tow, angle, as well as a sensor, preferably formed is a tension measuring strip, for determining the towing and/or pushing forces between tow vehicle and aircraft. Further, a sensor can be provided at the tow vehicle for the vehicle acceleration as well as the steering position. At these sensors electrical signals can be extracted as parameters for the control of the brakes and/or drive forces of the tow vehicle, which can be supplied to the control device as input signals. The control device preferably includes an electronic storage unit in which characteristic curves are stored for the brakes and/or propulsion control depending upon the values of the signals detected at the sensors, wherein various characteristic curves can be stored in the electronic memory unit for the various characteristic curves for the tow operation for the various aircraft types as well as various characteristic curves for the towing operation vs. for no-load operation. For no-load operation there is produced with the same brake pedal operation only a fraction of the brake-force produced during a towing operation.

Using the values detected by the various sensors, a comprehensive or adaptive control during braking of the tow vehicle can be achieved both during no load operation and during towing operations. By taking into consideration for the brake control those pushing or towing forces exercised on the towing vehicle by the towed aircraft, an adaptation of the brakes of the tow vehicle to the above-mentioned forces is possible. If additionally the towbar angle is taken into consideration as a control value, instabilities in the towing connection can be effectively prevented, which could occur when this angle exceeds the range of tolerance by even a few degrees. In such a case the brake force can automatically be reduced as the position of the brake pedal remains the same, in order to prevent a breaking away of the towed aircraft. A situation of this type occurs particularly when braking must occur while towing in a curve or corner. In certain cases, for prevention of critical situations, the brake force can even be reduced to zero and the drive motor of the towing vehicle can only be acted on for acceleration. Further, steering (wheel) position can also be taken into consideration as a control parameter.

It is further possible to control the brake force depending upon the vehicle speed, or in for example to established a stronger braking effect at higher towing speeds, so long as this is permissible taking into consideration the other control parameters. The simultaneous evaluation of the mentioned control parameters makes possible an optimal braking even under difficult conditions.

A further improvement of the brake control is achieved thereby, that for various predetermined aircraft types various brake characteristic curves are stored in the memory unit of the control device depending upon factors such as the weight and other relevant values of the aircraft types.

BRIEF DESCRIPTION OF THE DRAWING

In the following the invention will be described in greater detail on the basis of the embodiments schematically represented in the figures. There is shown in FIG. 1 a schematic diagram of the brake system of a towing vehicle and FIG. 2 an operating diagram of the brake control.

DETAILED DESCRIPTION OF THE INVENTION

Figure 1:
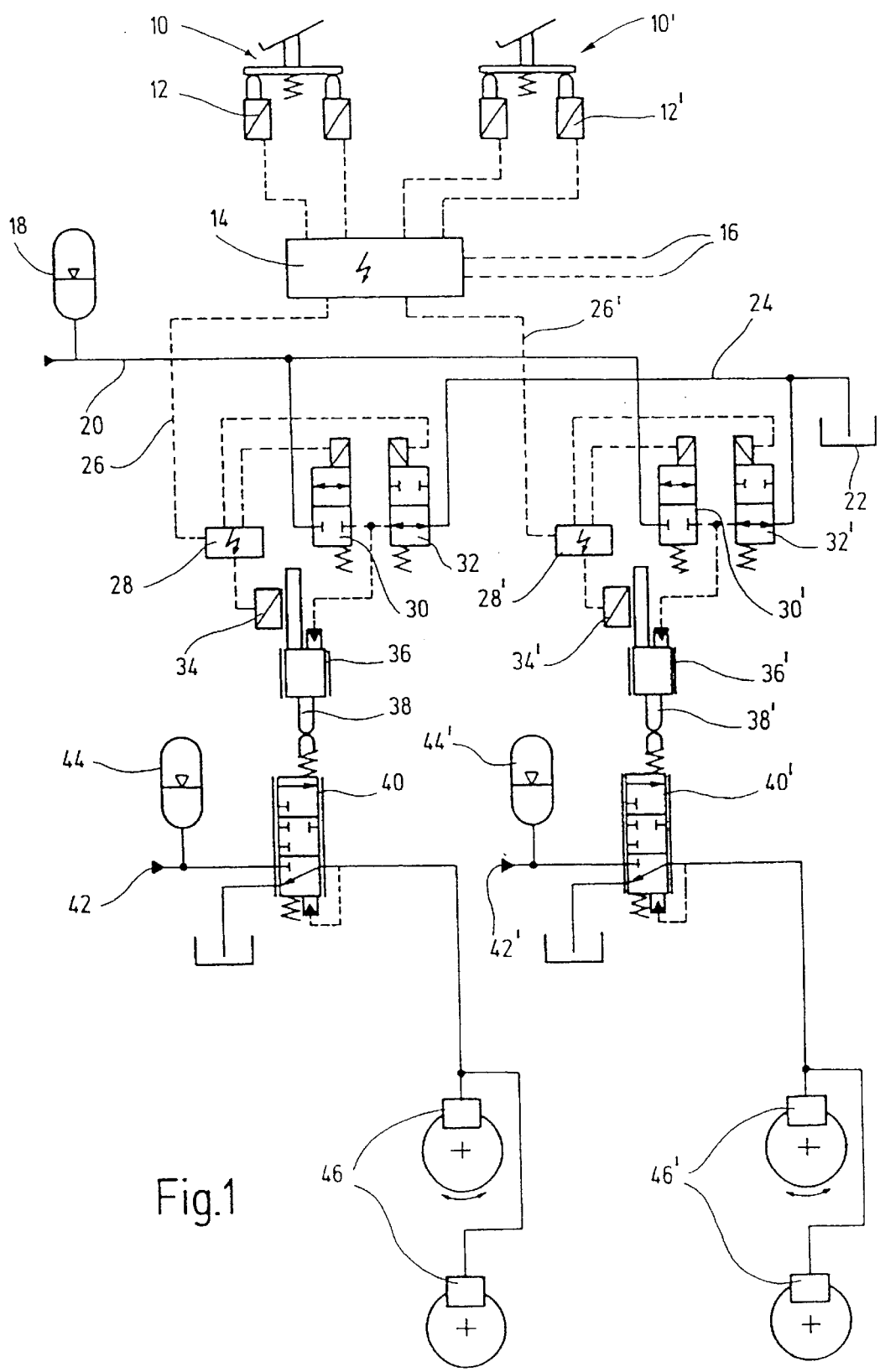

The brake system for a tow vehicle represented in FIG. 1 with two operator cabins can basically be divided into an electro-hydraulic control circuit represented in the upper half of the figure and a hydraulic brake circuit represented in the lower part of the figure. The brake system further includes two separate, identically constructed brake circuits.

The brake system includes two brake pedals 10, 10', one provided each one of the operator cabins respectively, which brake pedals are respectively provided with a position sensor 12, 12'. The position sensor 12, 12' produces an electrical signal, which is supplied to the control device 14 as desired value. Besides the inputs for the signals for the position sensors 12, 12' of the brake pedals 10, 10' the control device 14 receives further inputs such as signals from sensors provided on the vehicle for the vehicle speed, the position of the steering wheel, the tow angle of the tow rod and for the towing or push forces acting on the tow rod, of which two are shown by a way of example and indicated with reference number 16.

The control device 14 includes a real time computer for the evaluation of the desired value supplied by the position sensors 12, 12' and the measurement data supplied by the sensors 16. The electro-hydraulic control circuit includes a hydraulic reservoir 18 and a control oil supply conduit 20 as well as a return line 24 leading to an oil sump 22. The starting signals of the control unit 14 are supplied via electrical signal lines 26, 26' respectively to control electronics 28, 28' for magnetic valves 30, 32, 30', 32'. The control electronics 28, 28' further include an input for an electronic actual value signal of a displacement pick up 34, 34', which is provided on a hydraulic adjustment piston 36, 36' operable by the magnet valves 30, 32, 30', 32'.

The actual value determined at the displacement pick up 34, 34' is supplied via the control electronics 28, 28' to the control unit 14, where it is continuously compared with the desired value from the position sensor 12, 12'. Taking into consideration the sensor signal 16 and other predetermined operating parameters, which are stored in the control unit, there is produced in this manner a control circuit.

The adjusting piston 36, 36' acts via an actuating ram or plunger 38, 38' on the main brake valve 40, 40' of the hydraulic brake circuit. These respectively include a hydraulic oil supply 42, 42' with a hydraulic reservoir 44, 44'. Upon operation of the brake pedal 10, 10' the main brake valve 40, 40' is switched on or activated due to the small travel distance of the adjusting piston 36, 36', so that a brake pressure is built up at the brakes 46, 46'.

Figure 2:
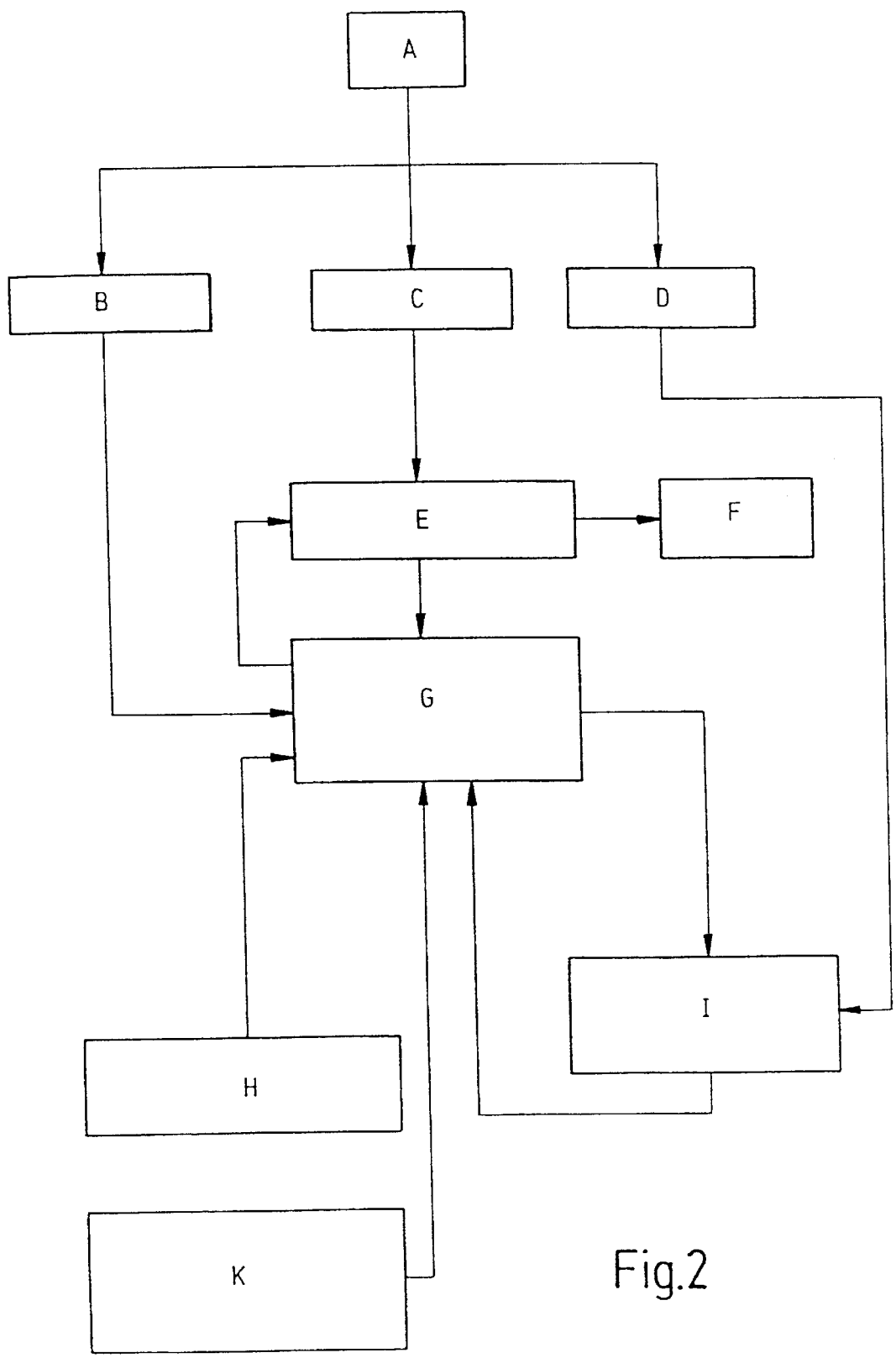

FIG. 2 is an operational schematic of the control circuit shown as a block diagram. Therein the following letters have the following meanings:

A: operator
B: aircraft types
C: brake pedal with position sensor
D: E-gas-unit
E: operating brake valve ram with position sensor system
F: brake force
G: real time computer for the evaluation of the desired value at the measured data
H: force measurement at the coupling of the tow rod
I: internal combustion engine, RPM control, vehicle speed
K: angle measurement of the vehicle longitudinal axis and the tow rod longitudinal axis In the towing process at first the operator A inputs the aircrafts type B. The driver A further operates the brake pedal C provided with the position sensor as well as the likewise electronic controlled gas pedal D. By pre-input of the aircraft type B, an appropriate stored characteristic curve for the brake control is selected in the control device G. Thereby, in the case of a heavy aircraft type, the same pedal position C produces a greater brake force F than in a case of aircraft of lighter type.

Upon operation of a brake pedal C, the desired value as determined by the position sensor is conveyed on to the electro hydraulic control E, G and converted into a travel distance for the main brake valve. The actual value determined at the adjusting piston is continuously compared in the control device G with the desired value and is regulated taking into consideration the selected brake characteristic curve as well as the control parameters H, I and K. If for example the detected brake force is too high for an existing tow angle, then this is automatically reduced, or the combustion engine I may even be so controlled for a short time internal, to stabilize the tow linkage. In this manner an optimal brake operation can be achieved in all operating conditions. This even makes it possible to significantly increase the towing speed in comparison to conventional towing vehicles.

In summary the following can be concluded: The invention relates to a towing vehicle for aircraft, comprising at least one operator's cabin which comprises control elements for steering, accelerating and braking the towing vehicle, in addition to a coupling member for creating a detachable connection between the aircraft and the towing vehicle, wherein the towing vehicle can be braked by hydraulic or pneumatic brakes 46, 46' acting on at least two wheels of the vehicle, wherein the braking control element is configured as a brake pedal 10, 10' which actuates the brakes 46, 46' either directly or via a control circuit. In order to simplify the construction of the braking system and to guarantee an optimal braking performance under all operating conditions, according to the invention, the brake pedal 10, 10' is respectively coupled to a position or angle sensor 12, 12', whose position or angle can be converted into an electric desired value control signal which controls at least one electro-hydraulic brake valve, using an electric signal transmission link 26, 26'.

What is claimed is:

1. A towing vehicle for aircraft, comprising
   a platform supported by wheels and having first and second ends,
   at least one operator's cabin which comprises control elements for steering, accelerating and braking the towing vehicle,
   a coupling member configured as a tow rod for creating a detachable connection between the aircraft and the towing vehicle,
   a coupling element for the tow rod provided at at least one of the ends of the vehicle,
   hydraulic or pneumatic brakes (46, 46') acting on at least two wheels of the vehicle for braking the towing vehicle,
   wherein the braking control element is a brake pedal (10, 10') which actuates the brakes (46, 46') either directly or via a control circuit,
   a position or angle sensor (12, 12') for converting the position or angle of the brake pedal (10, 10') into an electric desired value control signal which controls at least one electro-hydraulic brake valve using an electric signal transmission link (26, 26'),
   wherein the control circuit for the brakes (46, 46') includes an electronic computer as control device (14), which is supplied with at least the position information from the brake pedal (10, 10') as a control value,
   wherein the coupling element includes a sensor (16) for providing the tow angle between an aircraft and a tow vehicle and a sensor (16) for sensing the tug or pressure forces between an aircraft and the towing vehicle,
   wherein the towing vehicle includes at least one sensor (16) for vehicle speed and at least one sensor (16) for steering wheel position, wherein the sensors (16) provide electrical signals as parameters for the control of the braking and/or propulsion forces of the towing vehicle, which are supplied to the control device (14) as input signals, and
   wherein the control device (14) includes an electronic memory unit, in which characteristic curves can be stored for the control of braking and/or propulsion depending upon the values provided by the sensors (16).

2. A towing vehicle according to claim 1, wherein one operator cabin is positioned at each of said first and second ends of the vehicle platform.

3. A towing vehicle according to claim 2, comprising two separate brake circuits, both of which can be operated simultaneously by the brake pedals (10, 10') provided in the two operator cabins.

4. A towing vehicle according to claim 3, wherein each brake circuit includes a brake pressure controlling main brake valve (40, 40') configured as a proportional valve and including an actuating ram.

5. A towing vehicle according to claim 4, wherein the main control valve (40, 40') is adjustable via an electronic controlled adjustment piston (36, 36') actuated by at least one magnet valve (30, 32, 30', 32') and including a displacement pick up (34, 34'), wherein the displacement pickup (34, 34') provides an electric actual value for the control circuit.

6. A towing vehicle according to claim 5, wherein the adjustment piston (36, 36') has an actuating ram (38, 38') which is separate from and lies against the main control valve (40, 40').

7. A towing vehicle according to claim 1, wherein the coupling element includes a sensor (16) for providing the tow angle between an aircraft and a tow vehicle.

8. A towing vehicle according to claim 1, wherein the coupling element includes a sensor (16) for sensing the tug or pressure forces between an aircraft and the towing vehicle.

9. A towing vehicle as in claim 8, wherein said a sensor (16) for sensing the tug or pressure forces is a strain gauge.

10. A towing vehicle according to claim 1, wherein various characteristic curves for various types of aircraft are stored in the electronic memory unit.

11. A tow vehicle according to claim 1, wherein in the electronic memory unit there are stored various characteristic curves for towing operation under load and for operating without load, wherein when operating without load the same brake pedal movement produces only a fraction of the brake force realized during towing operation.

\* \* \* \* \*